US006312014B1

(12) United States Patent
Ando et al.

(10) Patent No.: US 6,312,014 B1
(45) Date of Patent: Nov. 6, 2001

(54) SHOULDER ANCHOR POSITION ADJUSTING DEVICE

(75) Inventors: Takayuki Ando; Tetsushi Muromachi; Yoshio Umezawa; Kenji Matsui, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/452,459

(22) Filed: Dec. 2, 1999

(30) Foreign Application Priority Data

Dec. 8, 1998 (JP) .................................................. 10-348460

(51) Int. Cl.[7] .................................................. B60R 22/20
(52) U.S. Cl. ........................................ 280/801.2; 297/483
(58) Field of Search .......................... 280/801.2, 801.1, 280/808; 297/483, 486, 468

(56) References Cited

U.S. PATENT DOCUMENTS

| 4,470,618 | * | 9/1984 | Ono ........................................ 280/808 |
| 4,917,403 | * | 4/1990 | Gyoda et al. ........................... 280/808 |
| 5,437,475 | * | 8/1995 | Sugimoto ............................ 280/801.2 |
| 5,655,793 | * | 8/1997 | Isonaga ............................... 280/801.2 |
| 5,725,248 | * | 3/1998 | Inoue et al. ......................... 280/801.2 |

FOREIGN PATENT DOCUMENTS 4-62254    5/1992 (JP) .

* cited by examiner

Primary Examiner—J. J. Swann
Assistant Examiner—F. Zeender
(74) Attorney, Agent, or Firm—Nixon Peabody LLP; Thomas W. Cole

(57) ABSTRACT

A shoulder anchor position adjusting device is provided in which assembly of a position adjusting mechanism, which adjusts a position of a shoulder anchor, is easy. The shoulder anchor is fixed to a slider. The slider is slidably mounted to a slide rail by the position adjusting mechanism which has a lock pin and a release lever. The release lever is placed on the slider in which a stepped groove is formed. The release lever is swingably held due to engagement of an anchor plate of a cover case with a cut-out groove. A flange portion is formed at the lock pin, and is supported by a step forming portion of the stepped groove. Due to a coil spring, a shaft portion of the lock pin is inserted through an insertion hole of the slider and is fit into an engagement hole formed in the slide rail.

5 Claims, 6 Drawing Sheets

SHOULDER ANCHOR POSITION ADJUSTING DEVICE

BACKGROUND OF THE INVENTION

1. Field of the Invention

The present invention relates to a shoulder anchor position adjusting device which adjusts the position of a shoulder anchor of a seat belt device.

2. Description of the Related Art

In general, for convenience of use of a seat belt, as illustrated in FIGS. 5 and 6, a shoulder anchor 12 which is a part of a seat belt device is mounted to a center pillar within a vehicle via a shoulder anchor position adjusting device 10 for adjusting the position of the shoulder anchor 12.

Specifically, the shoulder anchor position adjusting device 10 includes a slider 14, a slide rail 16, and a lock pin 20. The shoulder anchor 12, through which a webbing W is inserted, is mounted to the slider 14. The slider 14 is attached to the slide rail 16 so as to be able to slide therealong. The lock pin 20 can be fit into an engagement hole 18 formed in the slide rail 16.

The lock pin 20 is shaft-supported by a pin 24 at a release lever 22. A pin 25 which is provided at an intermediate portion of the release lever 22 is shaft-supported by shaft receiving portions 26 formed on the slider 14, such that the release lever 22 is swingable.

In this structure, by swinging the release lever 22 in a predetermined direction, the lock pin 20 which is inserted through a hole 27 is engaged with the engagement hole 18 or the engaged state thereof is released, such that the slider 14 is locked or becomes slidable.

However, in the above-described structure, in order to assemble the lock pin 20 to the release lever 22, holes through which the pin 24 is inserted are formed in the release lever 22. In the state in which the lock pin 20 is disposed at a predetermined position of the release lever 22, the pin 24 passes through the aforementioned holes, and thereafter, the special working of crushing both end portions of the pin 24 with a press is required in order to prevent the pin 24 from coming out of the holes. Further, another special working is required to form at the slider 14 the shaft receiving portions 26 which shaft-support the release lever 22.

SUMMARY OF THE INVENTION

In view of the aforementioned, an object of the present invention is to provide a shoulder anchor position adjusting device in which the assembly of a shoulder anchor position adjusting mechanism is easy and does not require special workings such as those described above.

A first aspect of the present invention is a shoulder anchor position adjusting device comprising: a slider to which a shoulder anchor, through which a webbing is inserted, is mounted; a slide rail which is fixed to a vehicle body and to which the slider is slidably mounted; a lever in which a receiving portion is formed and which is swingably disposed on the slider, an opening corresponding to an insertion hole formed in the slider being formed in the receiving portion; a lock pin at which a flange portion which is supported at the receiving portion of the lever is formed, and which is inserted into the insertion hole of the slider, and which can fit into and be removed from an engagement hole formed in the slide rail due to swinging operation of the lever; and a cover case which covers the slider and swingably holds the lever.

In accordance with the above-described structure, the shoulder anchor, through which the webbing is inserted, is mounted to the slider, and the slider is slidably mounted to the slide rail.

The lever is swingably placed on the slider. A receiving portion, in which an opening is formed, is formed at the lever. This opening corresponds to the insertion hole formed in the slider.

The flange portion of the lock pin is supported at the receiving portion of the lever. Due to urging force of the urging means, the lock pin is inserted through the insertion hole of the slider from the opening of the lever, and is fit into the engagement hole of the slide rail. Further, the cover case covers the slider, and swingably holds the lever. When the lever is swung in a predetermined direction, the lock pin is pulled out of the engagement hole such that the slide becomes slidable.

As described above, because the flange portion of the lock pin is supported at the receiving portion of the lever, when the lock pin and the lever are being assembled, there is no need for special working for assembling the lock pin to the lever, as there is in conventional structures. Further, because the lever is held swingably on the slider by the cover case, there is no need to subject the slider to special working, such as forming a holding member for holding the lever. Accordingly, the number of processes involved in assembly is decreased, and the shoulder anchor position adjusting mechanism can be assembled easily.

In a second aspect of the present invention, an anchor plate is formed at the cover case, and the anchor plate engages with a groove formed in the lever.

In accordance with this structure, the anchor plate formed at the cover case engages with the groove formed in the lever, and the lever can thereby be held on the slider and is swingable on the slider.

It is preferable that that lever is formed so as to be substantially V-shaped as viewed from above.

The shoulder anchor position adjusting device of the present invention may further comprise urging means for urging the lock pin in a direction of fitting-in into the engagement hole.

A third aspect of the present invention is a shoulder anchor position adjusting device comprising: a shoulder anchor position adjusting device comprising: a slider to which a shoulder anchor, through which a webbing is inserted, is mounted; a slide rail which is fixed to a vehicle body and to which the slider is slidably mounted; a lever in which an opening corresponding to an insertion hole formed in the slider is formed; and a lock pin inserted through the insertion hole via the opening, and able to be fit into and removed from an engagement hole formed in the slide rail, wherein a supported portion formed at the lock pin is removably supported at a lock pin supporting portion formed at the lever.

The supported portion may be a projecting portion which extends substantially perpendicular to an axial direction of the lock pin.

Further, at least one portion of the lock pin supporting portion may be formed so as to correspond to a configuration of the projecting portion.

A fourth aspect of the present invention is a shoulder anchor position adjusting device comprising: a shoulder anchor position adjusting device comprising: a slider to which a shoulder anchor, through which a webbing is inserted, is mounted; a slide rail which is fixed to a vehicle body and to which the slider is slidably mounted; a lever in which an opening corresponding to an insertion hole formed in the slider is formed; a lock pin inserted through the insertion hole via the opening, and able to be fit into and removed from an engagement hole formed in the slide rail; and a case member formed on the slider, wherein a groove portion is formed in the lever, and due to an anchor portion formed at the case member engaging with the groove portion, the lever is swingably held on the slider.

DESCRIPTION OF THE PREFERRED EMBODIMENTS

Hereinafter, a shoulder anchor position adjusting device relating to an embodiment of the present invention will be described in detail with reference to the accompanying drawings.

Figure 1:
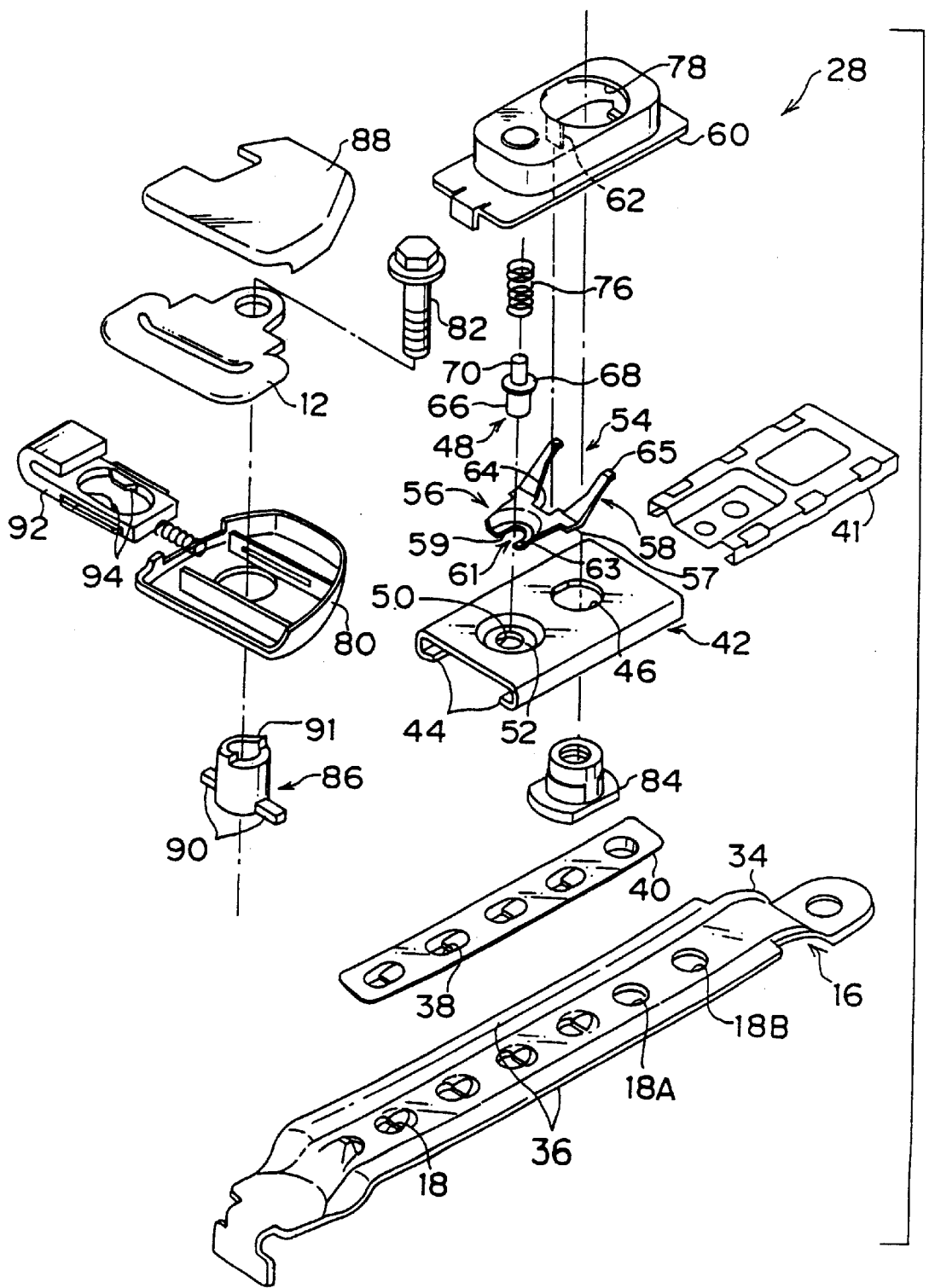
FIG. 1 is an exploded perspective view of a shoulder anchor position adjusting device relating to an embodiment of the present invention.
Figure 2:
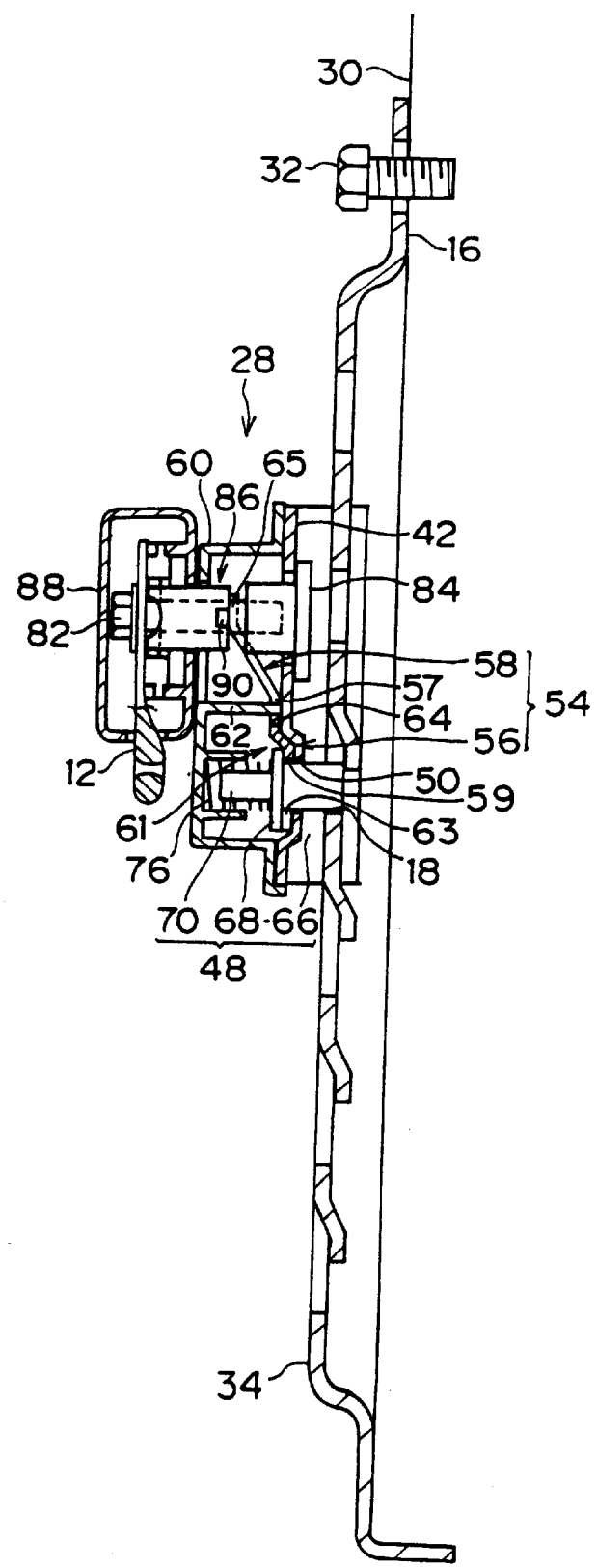
FIG. 2 is a vertical sectional view of the shoulder anchor position adjusting device relating to the embodiment of the present invention.

As illustrated in FIGS. 1 and 2, the slide rail 16 forms a portion of a shoulder anchor position adjusting device 28, and is connected to a center pillar 30 of a vehicle by a fixing means such as a screw 32 or the like.

The slide rail 16 is formed by a rectangular base plate 34 and guide side plates 36 which extend from the both widthwise direction side edges of the base plate 34. Plural engagement holes 18 are formed in the base plate 34. In addition to the engagement holes 18, two dummy holes 18A, 18B are also formed in the base plate 34.

A sheet 40, in which holes 38 corresponding to the engagement holes 18 are formed, is disposed on the slide rail 16. A slider 42 is mounted, via a shoe 41, to the slide rail 16 (the guide side plates 36). Accordingly, when the slider 42 moves on the slide rail 16 upwardly (in the sliding direction), the sheet 40 prevents noise (such as a scraping noise) from being generated due to contact of the slide rail 16 and a lock pin 48 which will be described later.

Sliding portions 44, which are bent inwardly so as to engage the guide side plates 36, are formed at the widthwise direction side portions of the slider 42. Holes are formed in two places in the top surface of the slider 42. One of the holes serves as a bolt insertion hole 46 for a bolt which will be described later, and the other hole serves as an insertion hole 50 through which the lock pin 48 is inserted. A counterbore 52 is formed at the periphery of the insertion hole 50.

A placed surface 57 of a release lever 54 is placed on the top surface of the slider 42. The release lever 54 is formed by a base member 56 and a pair of arm members 58. The placed surface 57 is formed at an end portion of the base member 56. The pair of arm portions 58 extend from the placed surface 57 with a cut-out groove 64, which will be described later, formed therebetween. The release lever 54 is substantially V-shaped when viewed from above. An abutment surface 65 is formed at the distal end of each of the arm members 58. Due to the relationship between the forces which are applied to the arm members 58 and the base member 56, the release lever 54 swings (rotates) on the slider 42 around a corner portion (bent portion) of the placed surface 57.

The cut-out groove 64 is formed in the end portion center of the placed surface 57. When the shoulder anchor position adjusting device 28 is being assembled, the cut-out groove 64 engages with an anchor plate 62 formed at a cover case 60 which will be described later.

In this way, the base member 56 of the release lever 54, which forms a portion of the position adjustment mechanism of the shoulder anchor 12, is placed on the slider 42, and the anchor plate 62 formed at the cover case 60 engages with the cut-out groove 64, such that the release lever 54 is swingably held and, at the same time, is positioned. Thus, the release lever 54 can be easily assembled with the slider 42 without the need for special working such as forming shaft receiving portions on the slider 42 or the like.

A stepped groove 61, whose bottom portion is formed in a U-shape, is formed at the base member 56. An opening 59 corresponding to the insertion hole 50 is formed in the bottom portion of the stepped groove 61.

A shaft portion 66 of the lock pin 48 is inserted into the insertion hole 50. A flange portion 68 of the lock pin 48 is supported at a step forming portion 63 of the stepped groove 61.

A coil spring 76 is disposed at the outer periphery of a spring attachment portion 70 of the lock pin 48. One end of the coil spring 76 abuts the flange portion 68, whereas the other end of the coil spring 76 abuts the cover case 60. The lock pin 48 is always urged downward by the coil spring 76 so that the shaft portion 66 of the lock pin 48 is fit into the engagement hole 18.

In this way, the flange portion 68 of the lock pin 48, which forms a portion of the position adjusting mechanism of the shoulder anchor 12, is supported and positioned by the step forming portion 63 of the stepped groove 61. Thus, the lock pin 48 and the release lever 54 can be easily assembled without the need for special working for assembling the lock pin 48 to the release lever 54.

A collar 86 is disposed above the abutment surfaces 65 of the arm members 58 of the release lever 54. Rod-shaped projections 90 project horizontally at the lower portion of the collar 86. The projections 90 can be placed on the abutment surfaces 65 of the arm members 58 and are pushed downward. Further, an inclined surface 91 is formed on the top portion of the collar 86.

A slide button 92 is provided at a reverse cover 80. When the slide button 92 is pushed-in into the reverse cover 80, due to a cam mechanism, convex portions 94 formed in the slide button 92 apply pressure to the inclined surface 91 at the top portion of the collar 86.

After the release lever 54, the lock pin 48, the coil spring 76 and the collar 86 have been placed on the slider 42, the cover case 60 is mounted from above. An insertion opening 78, through which the collar 86 is inserted, is formed in the cover case 60. The rectangular anchor plate 62 is formed integrally with the cover case 60 from a predetermined portion of the circular peripheral portion of the insertion opening 78 at the reverse side of the cover case 60, so as to extend substantially perpendicularly downward.

The shoulder anchor 12 is attached by a fixing means such as a bolt 82, a nut 84 and the like, to the upper surface of the cover case 60 via the reverse cover 80. The bolt 82 is inserted through the collar 86, passes through the insertion opening 78 of the cover case 60 and the bolt insertion hole 46 of the slider 42, and is screwed together with the nut 84. Further, a front cover 88 is attached to the top surface of the shoulder anchor 12.

Next, operation of the shoulder anchor position adjusting device relating to the present embodiment will be explained.

Figure 3:
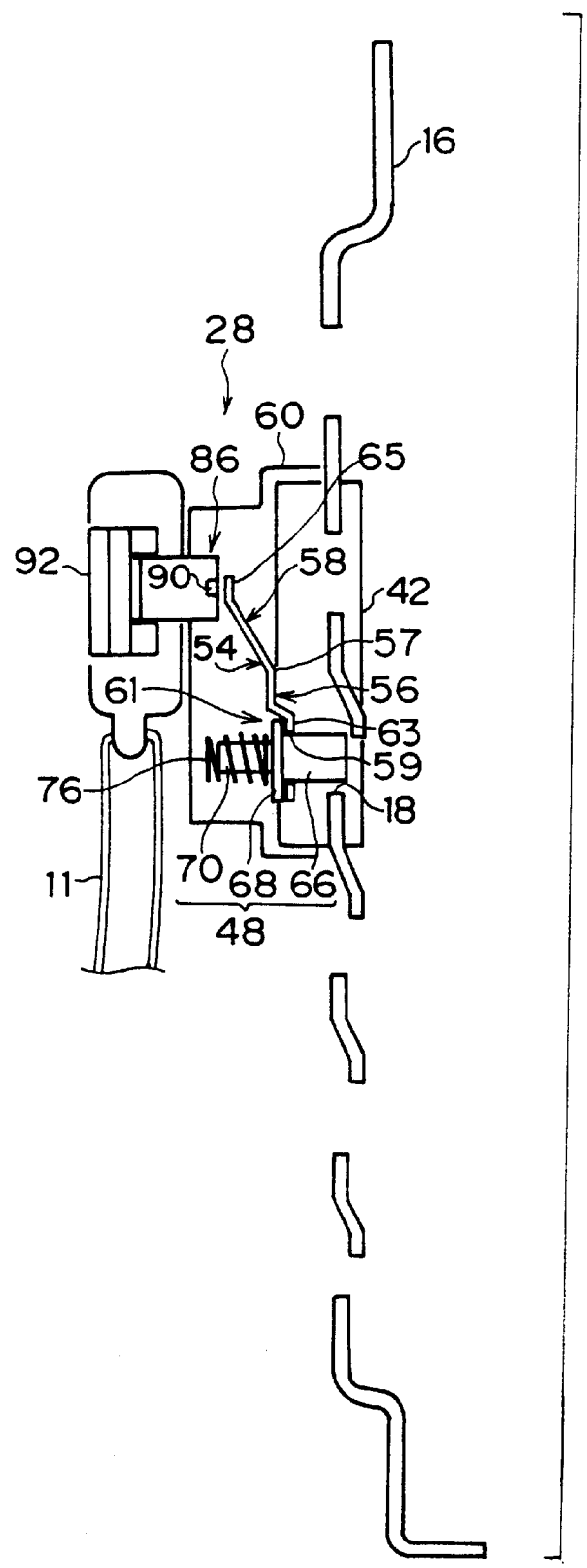
FIG. 3 is a vertical sectional view illustrating a state in which the shoulder anchor position adjusting device relating to the embodiment of the present invention is locked.

As illustrated in FIG. 3, the flange portion 68 of the lock pin 48 abuts the step forming portion 63 of the stepped groove 61 formed at the base member 56 of the release lever 54. Due to the urging force of the coil spring 76 disposed at the spring attachment portion 70, the shaft portion 66 of the lock pin 48 is fit into the engagement hole 18. In this way, the slider 42 is fixed to the slide rail 16 without sliding, and therefore, the shoulder anchor 12 mounted to the slider 42 is fixed.

When the position of the shoulder anchor 12, i.e., the position of the slider 42, is to be adjusted, the lock pin 48 is removed from the engagement hole 18.

Figure 4:
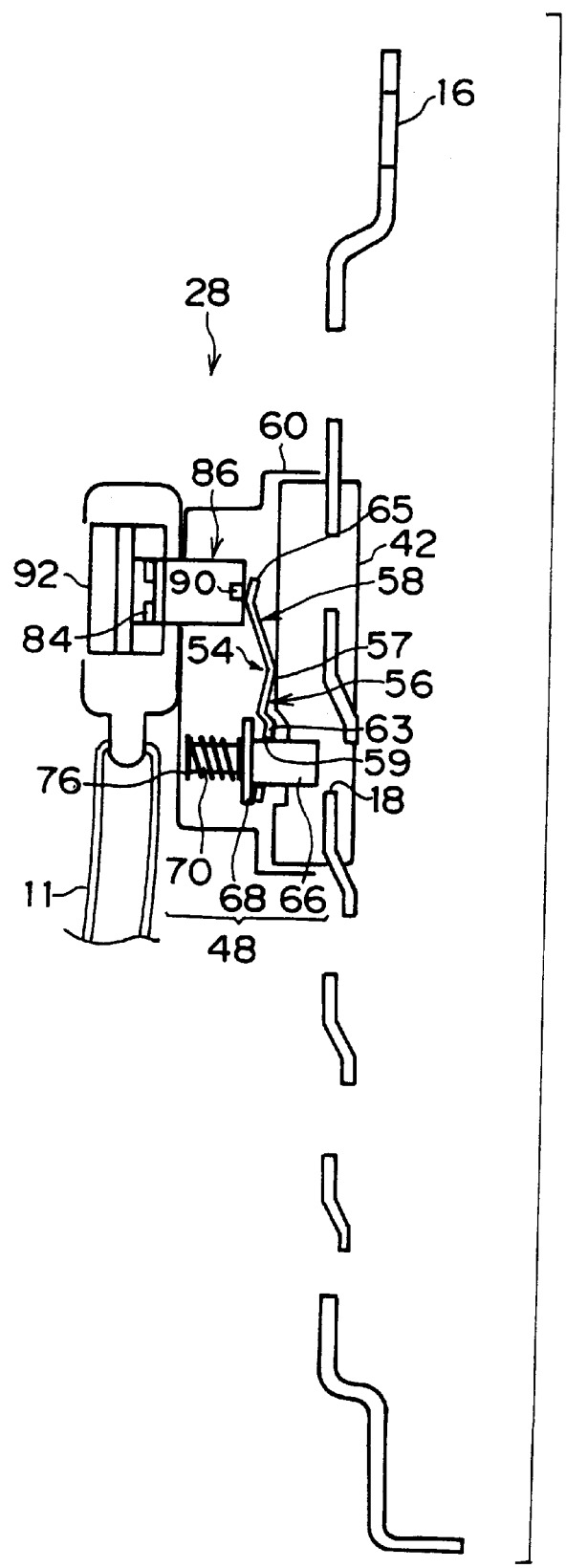
FIG. 4 is a vertical sectional view illustrating a state in which the shoulder anchor position adjusting device relating to the embodiment of the present invention is unlocked.
Figure 5:
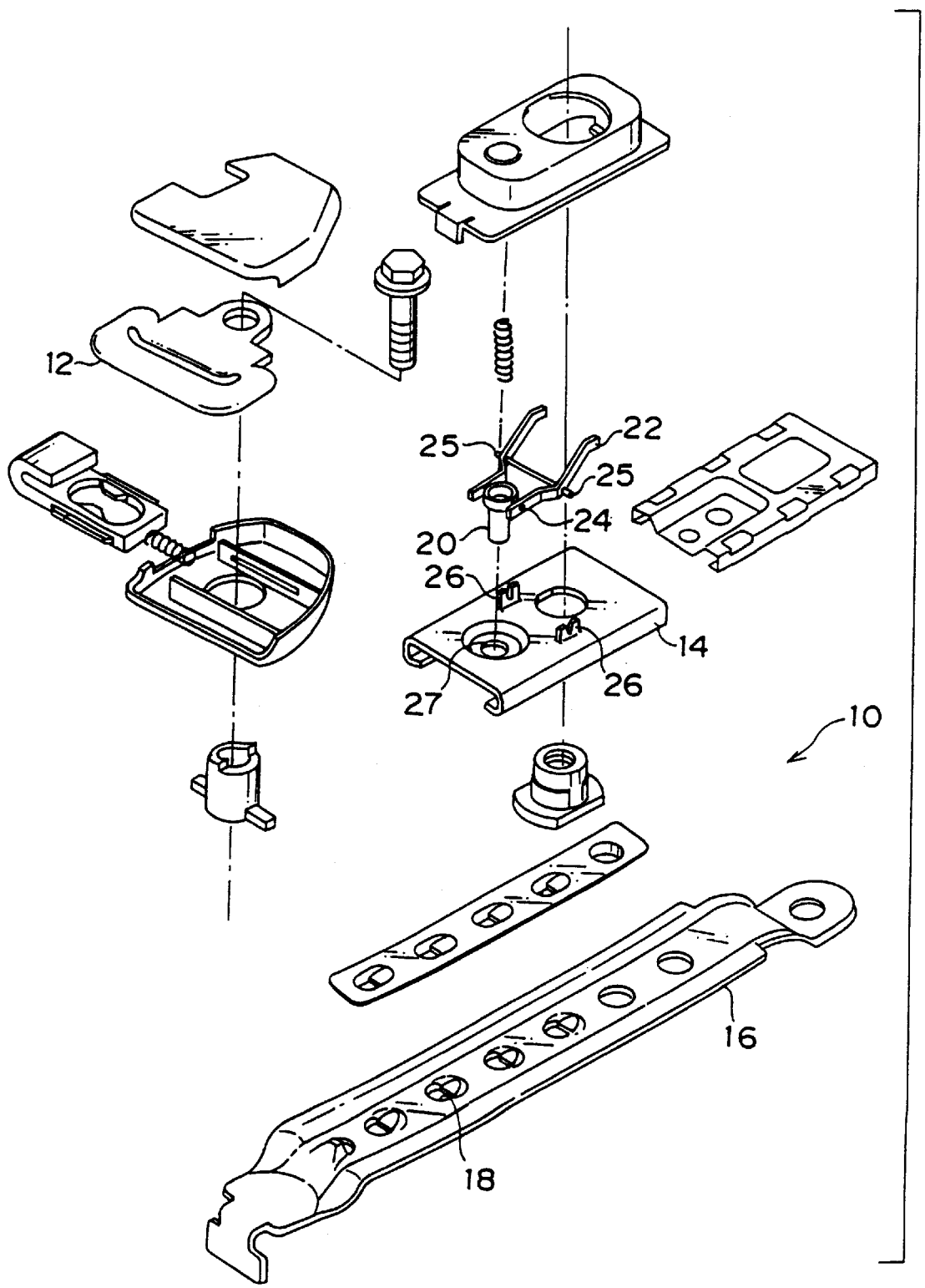
FIG. 5 is an exploded perspective view of a conventional shoulder anchor position adjusting device.
Figure 6:
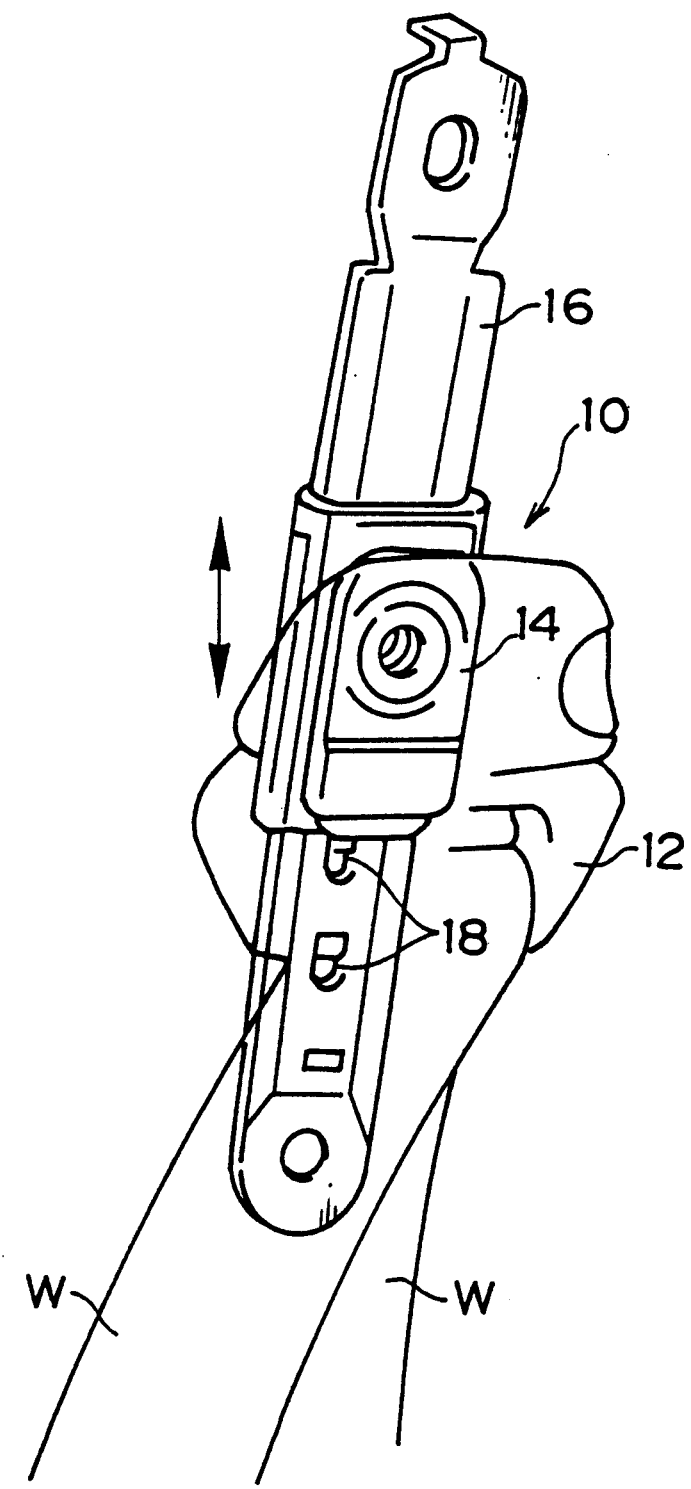
FIG. 6 is an overall perspective view of the conventional shoulder anchor position adjusting device.

More specifically, as illustrated in FIG. 4, by pushing the slide button 92 into the reverse cover 88, the convex portions 94 formed at the slide button 92 abut the inclined surface 91, and the collar 86 is pushed downward by the cam mechanism. Then, the projections 90 formed at the collar 86 push the arm members 58 of the release lever 54 downward.

As a result, when a force (torque) which is greater than the urging force of the coil spring 76 (the torque due to the urging force) is applied to the arm members 58, the release lever 54 rotates around the corner portion of the placed surface 57. As a result, the step forming portion 63 of the stepped groove 61 pushes the flange portion 68 of the lock pin 48 upward. The shaft portion 66 of the lock pin 48 comes out of the engagement hole 18, the slider 42 becomes able to slide, and the shoulder anchor 12 can be moved to a predetermined position.

In accordance with the shoulder anchor position adjusting device of the present invention, assembly of the shoulder anchor position adjusting mechanism is facilitated.

What is claimed is:

1. A shoulder anchor position adjusting device comprising:
   a slider to which a shoulder anchor, through which a webbing is inserted, is mounted;
   a slider rail which is fixed to a vehicle body and to which the slider is slidably mounted;
   a lever in which a receiving portion is formed at one end thereof and which is disposed on the slider wherein an opening corresponding to an insertion hole formed in the slider being formed in the receiving portion and further including a pair of arms formed at the other end of the lever which define a groove therebetween;
   a lock pin at which a flange portion which is supported at the receiving portion of the lever is formed, and which is inserted into the insertion hole of the slider, and which can fit into and be removed from an engagement hole formed in the slider rail due to swinging operation of the lever and
   a cover case positioned on the slider which covers the lever and lock pin and includes an integrally formed anchor plate that engages the groove formed in the lever to swingably hold the lever on the slider.

2. A shoulder anchor position adjusting device according to claim 1, wherein the lever is formed to be substantially V-shaped when viewed from above.

3. A shoulder anchor position adjusting device according to claim 1, further comprising:
   urging means for urging the lock pin in a direction of fitting-in into the engagement hole.

4. A shoulder anchor position adjusting device comprising;
   a slider to which a shoulder anchor, through which a webbing is inserted, is mounted;
   a slide rail which is fixed to vehicle body and to which the slider is slidably mounted;
   a lever in which an opening is formed at one end of the lever and corresponds to an insertion hole formed in the slider;
   a lock pin inserted through the insertion hole via the opening, and able to be fit into and removed from an engagement hole formed in the slide rail; and
   a case member positioned on the slider which includes an integrally formed anchor portion and which covers the lever and the lock pin,
   wherein a groove portion is formed at the other end of the lever, and the lever is swingably held on the slider due to the anchor portion engaging the groove portion.

5. A shoulder anchor position adjusting device comprising:
   a slider to which a shoulder anchor, through which a webbing is inserted, is mounted;
   a slider rail which is fixed to a vehicle body and to which the slider is slidabily mounted;
   a lever in which a receiving portion is formed and which is swingably disposed on the slider, an opening corresponding to an insertion hole formed in the slider being formed in the receiving portion;
   a lock pin at which a flange portion which is supported at the receiving portion of the lever is formed, and which is inserted into the insertion hole of the slider, and which can fit into and be removed from an engagement hole formed in the slider rail due to swinging operation of the lever and
   a cover case positioned on the slider and including an integrally formed anchor portion whereby the anchor portion engages the lever such that the lever is swingably held on the slider.

* * * * *